(12) United States Patent
Goerge et al.

(10) Patent No.: US 9,948,499 B2
(45) Date of Patent: Apr. 17, 2018

(54) LOCATION OF UNIDIRECTIONAL HANDOVER RELATIONSHIPS

(75) Inventors: Jürgen Goerge, Neuried (DE); Olaf Pollakowski, Berlin (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 2388 days.

(21) Appl. No.: 12/225,739

(22) PCT Filed: Mar. 22, 2007

(86) PCT No.: PCT/EP2007/052725
§ 371 (c)(1),
(2), (4) Date: Dec. 15, 2008

(87) PCT Pub. No.: WO2007/110360
PCT Pub. Date: Oct. 4, 2007

(65) Prior Publication Data
US 2009/0100175 A1    Apr. 16, 2009

(30) Foreign Application Priority Data
Mar. 28, 2006   (DE) ..................... 10 2006 014 357

(51) Int. Cl.
*H04L 12/24* (2006.01)
*H04W 24/00* (2009.01)

(52) U.S. Cl.
CPC ...... *H04L 41/0233* (2013.01); *H04L 41/0206* (2013.01); *H04L 41/12* (2013.01); *H04W 24/00* (2013.01)

(58) Field of Classification Search
None
See application file for complete search history.

(56) References Cited

U.S. PATENT DOCUMENTS 5,586,255 A * 12/1996 Tanaka et al. ................ 709/223
6,889,229 B1 * 5/2005 Wong et al. ................... 707/610
(Continued)

FOREIGN PATENT DOCUMENTS

| DE | 197 40 713 A1 | 4/1999 |
| DE | 198 13 754 A1 | 9/1999 |
| DE | 103 37 450 A1 | 12/2003 |

OTHER PUBLICATIONS

3rd Generation Partnership Project; Technical Specification Group Services and System Aspects; Telecommunication management; Configuration Management (CM); Bulk CM Integration Reference Point (IRP): Common Object Request Broker Architecture (CORBA) Solution Set (SS); 3GPP TS 32.613 V7.0.0 (Jun. 2007); 2007; pp. 1-31.

(Continued)

*Primary Examiner* — Azizul Choudhury
(74) *Attorney, Agent, or Firm* — Squire Patton Boggs (US) LLP

(57) ABSTRACT

A management system includes a first management device storing information regarding: objects monitored by the first management device, objects monitored by a second management device and relationships between objects monitored by the first management device and objects monitored by the second management device. The first management device requests such information from the second management device. Using the information stored by the first management device and the information requested from the second management device, the first management device ascertains at least one relationship between at least one object monitored by the first management device and at least one object monitored by the second management device and which is stored either just by the first management device or just by the second management device.

14 Claims, 2 Drawing Sheets

(56) References Cited

U.S. PATENT DOCUMENTS

| | | | |
|---|---|---|---|
| 2001/0053144 A1* | 12/2001 | Leroy et al. | 370/349 |
| 2003/0105761 A1* | 6/2003 | Lagerman | H04L 41/0213 |
| 2003/0207687 A1* | 11/2003 | Svedevall | H04W 36/10 |
| | | | 455/436 |
| 2004/0022226 A1* | 2/2004 | Edlund et al. | 370/338 |

OTHER PUBLICATIONS

3rd Generation Partnership Project; Technical Specification Group Services and System Aspects; Telecommunication management; Configuration Management (CM); Bulk CM Integration Reference Point (IRP); Common Management Information Protocol (CMIP) Solution Set (SS); 3GPP TS 32.614 V6.1.0 (Mar. 2005); 2005; pp. 1-28.

3rd Generation Partnership Project; Technical Specification Group Services and System Aspects; Telecommunication management; Configuration Management (CM); Bulk CM Integration Reference Point (IRP): eXtensible Markup Language (XML) file format definition; 3GPP TS 32.615 V7.2.0 (Sep. 2007); 2007; pp. 1-34.

3rd Generation Partnership Project; Technical Specification Group Services and System Aspects; Telecommunication management; Configuration Management (CM); Bulk CM Integration Reference Point (IRP): Information Service (IS); 3GPP TS 32.611 V7.0.0 (Jun. 2007); 2007; pp. 1-59.

3rd Generation Partnership Project; Technical Specification Group Services and System Aspects; Telecommunication management; Configuration Management (CM); Bulk CM Integration Reference Point (IRP): Requirements; 3GPP TS 32.612 V7.2.0 (Mar. 2007); 2007; pp. 1-11.

International Search Report for PCT/EP2007/052725; dated Jul. 17, 2007.

* cited by examiner

LOCATION OF UNIDIRECTIONAL
HANDOVER RELATIONSHIPS

CROSS REFERENCE TO RELATED
APPLICATIONS

This application is based on and hereby claims priority to German Application No. 10 2006 014 357.4 filed on Mar. 28, 2006, the contents of which are hereby incorporated by reference.

BACKGROUND

Described below is a method of operating a management system, in which a first management device stores information relating to objects monitored by the first management device, relating to objects monitored by a second management device, and relating to relationships between objects monitored by the first management device and objects monitored by the second management device.

In line with the principles of a management network, also referred to as TMN (Telecommunications Management Network) principles, there are a plurality of management layers for the management of a communication system—such as a mobile radio communication system—wherein each layer with the exception of the topmost and bottommost layers has a dual function, namely a manager function and an agent function. In the managing system, every level apart from the bottommost one performs a manager function for the underlying level. In the managed system, every level apart from the topmost one is assigned an agent function for the next highest layer.

For the purpose of network monitoring and control, managers start operations by sending what are known as "requests", which are executed by agents, and receive corresponding acknowledgements, what are known as "responses", from the agents. Elements of the telecommunication network, also referred to as resources of the telecommunication network, which form the role of an agent in a TMN hierarchy, identify relevant events, such as alarms, generate appropriate messages, e.g. what are known as "notifications", and transmit them in the form of event reports to managers in order to allow efficient network management.

Network management may include, inter alia, fault management and/or configuration management and/or security management and/or accounting management and/or performance management. The network management is intended to provide suitable mechanisms for information distribution and management, so that a comprehensive picture of the network state is available when required and the individual resources of the telecommunication network can be monitored and configured efficiently.

The manager/agent communication is effected by what are known as management interfaces or manager/agent interfaces which, in an object-oriented environment, are characterized by a communication protocol, such as CMIP (Common Management Information Protocol) based on ITU-T X.711 or CORBA (Common Object Request Broker Architecture), and by an object model. Object models are used to model resources of the telecommunication network, these resources being classified into object classes for the modeling.

Such interfaces exist, by way of example, between the network element management level, on the one hand, and the network element level, on the other. An example of network devices on this manager/agent interface are the operation and maintenance centers (OMCs) on the network element management level and, on the network element level, devices such as base stations in the base station system (BSS) of a GSM mobile radio network, or base stations in other communication networks, for example NodeBs in a UMTS (Universal Mobile Telecommunication System) mobile radio network, or base stations in a WiMAX system, or radio access points in a WLAN (Wireless Local Area Network) system, for example based on one of the IEEE 802.11 standards.

Management interfaces or manager/agent interfaces also exist between the network management level, on the one hand, and the network element management level, on the other. An example of network devices for this manager/agent interface are the network management centers (NMCs) on the network management level and the operation and maintenance centers (OMCs) on the network element management level, e.g. in the GSM or another mobile radio or telecommunication network.

SUMMARY

Described herein are an efficient method for operation a management system, and apparatuses for carrying out the method.

In the method described herein for operating a management system, a first management device stores information relating to objects monitored by the first management device, relating to objects monitored by a second management device, and relating to relationships between objects monitored by the first management device and objects monitored by the second management device. The first management device requests information stored by the second management device relating to objects monitored by the first management device, relating to objects monitored by the second management device, and relating to relationships between objects monitored by the first management device and objects monitored by the second management device. The first management device uses the information stored by the first management device and the information requested from the second management device to ascertain at least one relationship between at least one object monitored by the first management device and at least one object monitored by the second management device, this relationship being stored either only by the first management device or only by the second management device.

The two management devices respectively monitor objects. A management device monitoring an object can access the respective object, can start operations in respect of this object, and receives reports from the monitored object. The management devices respectively store information about objects which they monitor. In addition, the management devices have information relating to objects monitored by the respective other management device. The respective management device has read-only access to these "external" objects. The information available to the management device is merely copies of the information which is available, or was available at an earlier time, to the management device monitoring the object. In this case, the first management device can store information about all or only about one or some of the objects monitored by the second management device. An equivalent situation also applies to the second management device.

It is possible that the two management devices have stored different information in respect of a particular object. In particular, the information which a management device stores in respect of an object monitored by the other management device may be a subset of the information stored by the other management device monitoring the object.

Objects which are monitored by different management devices may have a relationship with one another in line with the information available to the management devices. It makes sense to store such relationships, since often objects monitored by different management devices influence one another. By comparing information available to the first management device with information available to the second management device, the first management device ascertains particular kinds of relationships. These are relationships which are either stored by the first management device and not by the second management device or which are stored by the second management device and not by the first management device. The condition that the relationships sought by the first management device are stored either only by the first management device or only by the second management device therefore means that precisely one of the two management devices has knowledge of this relationship. It is not relevant in this context whether further management devices apart from the first and second management devices possibly know this relationship.

The information stored by the second management device can be requested by the first management device in different ways. In the case of a pull mechanism, for example, the information is actively requested from the second management device by the first management device. In the case of a push mechanism, on the other hand, the second management device provides the information and the first management device requests this provided information and receives it. This may be done using a method in which the second management device "publishes" the information it stores, whereupon the first management device requests or receives the published information.

In development, the first management device makes changes to the information stored by the first management device in respect of at least one ascertained relationship which is stored only by the second management device, so that this relationship is also stored by the first management device. In this case, only the first management device reacts to the ascertainment or detection of the relationship by making a change to its stored information. In respect of this relationship, this produces symmetry between the information in the first and second management devices.

In line with another development, the first management device sends a message concerning information about at least one relationship which is stored only by the first management device to the second management device. This message preferably includes identification information relating to an object monitored by the first management device and identification information relating to an object monitored by the second management device. The message may relate to a plurality of relationships ascertained by the first management device and hence indicate more than two objects. It is possible that the message relates to an object which is monitored by the first management device and which is unknown to the second management device. This means that the second management device has not stored any information about this object. In this case, it is advantageous if the message contains information to be stored by the second management device relating to this object which has hitherto been unknown to it.

Preferably, the second management device makes a change to the information stored by the second management device, so that the relationship about which the message provides information is also stored by the second management device. In this case, not only does the first management device react to the ascertainment or detection of the relationship, but also the second management device reacts to the reception of the message from the first management device by making a change to its stored information. In respect of this relationship, this produces symmetry between the information in the first and second management devices.

In line with one refinement, the first management device makes changes to the information stored by the second management device in respect of at least one ascertained relationship which is stored only by the first management device, so that this relationship is also stored by the second management device. This requires the first management device to have access to the memory of the second management device.

It is particularly advantageous if the communication between the first management device and the second management device takes place via a peer-to-peer interface. Such interfaces are described in Tele Management Forum TMF-058, for example.

Preferably, the information which the first management device and the second management device store relating to monitored objects includes values for attributes of the respective objects.

In one refinement, the objects are radio cells in a mobile radio communication system and the relationships between the objects are handover relationships. In this case, a handover relationship indicates that a handover, i.e. a change from a subscriber station from one radio cell to another cell, is possible. Besides the information relating to the radio cells, the first and second management devices may also store information relating to other objects.

Preferably, the first and second management devices are homogeneous management devices, such as element managers in a mobile radio communication system. These are situated on the same hierarchy level of the management system. In this case, the two management devices do not need to be from the same manufacturer. Preferably, the homogeneity relates to peer-to-peer communication between the two management devices; in this case, homogeneity means that the two management devices are "peers".

The management device includes a storage unit storing information relating to objects monitored by the management device, relating to objects monitored by a second management device, and relating to relationships between objects monitored by the management device and objects monitored by the second management device, and also means for requesting information stored by the second management device relating to objects monitored by the management device, relating to objects monitored by the second management device, and relating to relationships between objects monitored by the management device and objects monitored by the second management device. In addition, means are provided for ascertaining at least one relationship between at least one object monitored by the management device and at least one object monitored by the second management device, the relationship being stored either only by the management device or only by the second management device, using the information stored by the management device and the information requested from the second management device.

The management system includes a first management device, a second management device, and also objects monitored by the first management device and objects monitored by the second management device. The first management device stores information relating to objects monitored by the first management device, relating to objects monitored by a second management device, and relating to relationships between objects monitored by the first management device and objects monitored by the second management device. The second management device stores information relating to objects monitored by the first management device, relating to objects monitored by the second management device, and relating to relationships between objects monitored by the first management device and objects monitored by the second management device. The first management device also requests information stored by the second management device relating to objects monitored by the first management device, relating to objects monitored by the second management device, and relating to relationships between objects monitored by the first management device and objects monitored by the second management device, and also ascertains at least one relationship between at least one object monitored by the first management device and at least one object monitored by the second management device, the relationship being stored either only by the first management device or only by the second management device, using the information stored by the first management device and the information requested from the second management device.

The management device and the management system described below are particularly suitable for carrying out the method described below, this also being applicable to the refinements and developments.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
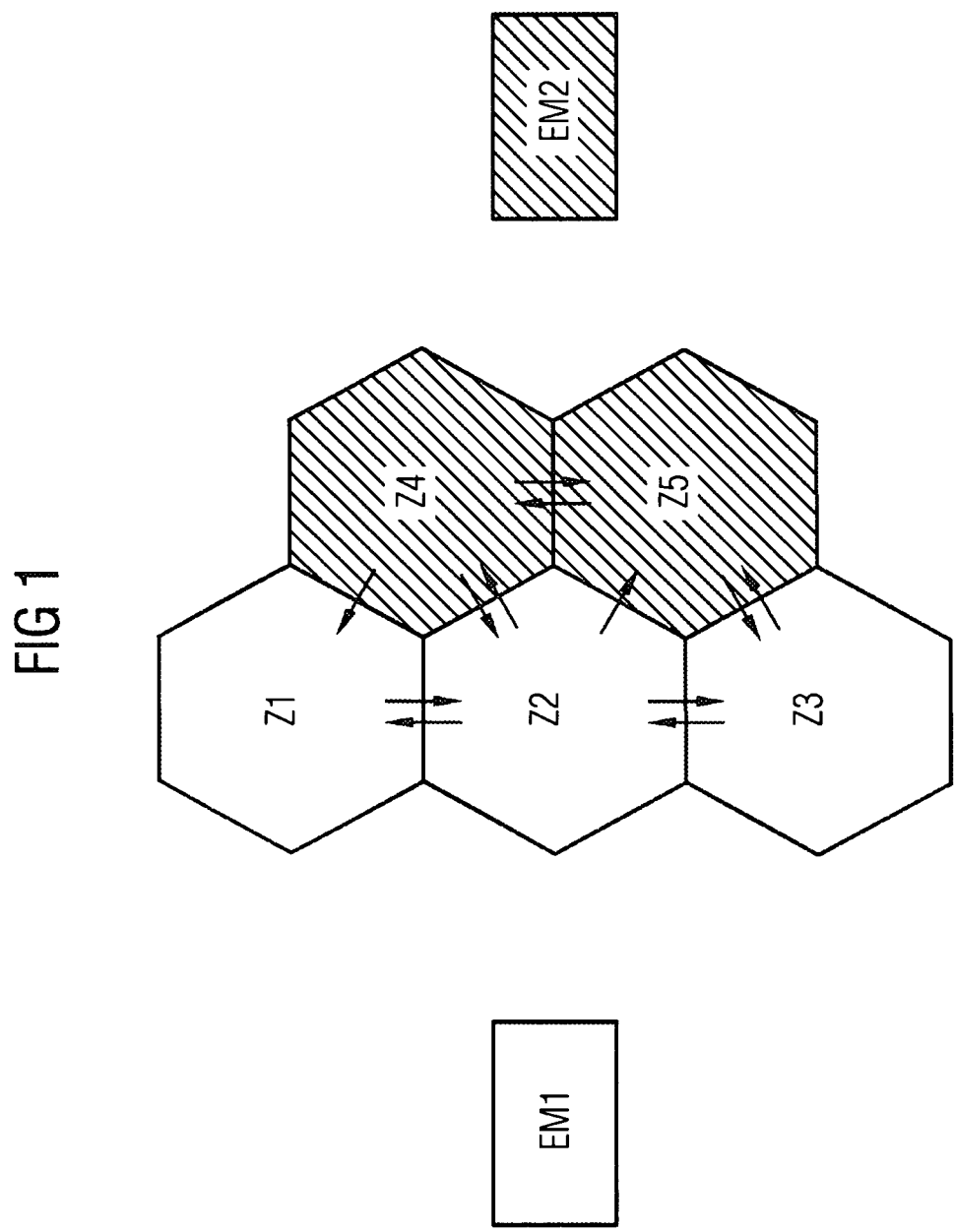
FIG. 1 is a block diagram of a detail from a mobile communication system.

Reference will now be made in detail to the preferred embodiments, examples of which are illustrated in the accompanying drawings, wherein like reference numerals refer to like elements throughout.

The detail from a cellular mobile radio communication system which is shown in FIG. 1 includes the radio cells Z1, Z2, Z3, Z4 and Z5, and also the two management devices EM1 and EM2 (EM: Element Manager). The management device EM1 is responsible for monitoring the radio cells Z1, Z2 and Z3, and the management device EM2 is responsible for the radio cells Z4 and Z5. From the point of view of the management devices EM1 and EM2, the radio cells Z1, Z2, Z3, Z4 and Z5 are managed objects which they are responsible for monitoring. The radio cells Z1, Z2, Z3, Z4 and Z5 are respectively associated with an object class and respectively represent a particular object instance in their respective object class.

The management device EM1 stores information in the form of values for attributes relating to its own radio cells Z1, Z2 and Z3 as master objects, while the management device EM2 stores information in the form of values for attributes relating to its own radio cells Z4 and Z5 as master objects. In addition, the management devices EM1 and EM2 can store information in the form of values for attributes of the radio cells of the respective other management device EM1 or EM2 as external objects. An external object means that the respective management device is not responsible for monitoring this object, and therefore cannot send any operations to the respective object, for example, and cannot arrange any change to attributes in respect of the respective object. The information which is stored in relation to an external object is merely a copy of the data from the associated master object.

Besides the information relating to the radio cells Z1, Z2, Z3, Z4 and Z5, the management devices EM1 and EM2 also store neighborhood relationships (adjacencies) between the radio cells Z1, Z2, Z3, Z4 and Z5. This is motivated by the fact that handover, i.e. changes for a subscriber radio station from one radio cell to an adjacent radio cell, need to be possible. If, in respect of a particular radio cell, such a handover relationship concerning another radio cell is stored, this means that a handover from this radio cell to the other radio cell is possible. This is symbolized in FIG. 1 as an arrow emerging from a radio cell.

If one considers two adjacent radio cells, there is usually a bidirectional handover relationship. That is to say that it is possible either to perform a handover from the first to the second of the two radio cells or to perform a handover from the second to the first of the two radio cells. In contrast, unidirectional handover relationships, i.e. the situation in which a handover is possible only from the first to the second but not from the second to the first of the two radio cells, are normally not used. It is subsequently assumed that there is a respective bidirectional handover relationship between respective adjacent radio cells in FIG. 1, i.e. between the radio cells Z1 and Z2, Z1 and Z4, Z2 and Z4, Z2 and Z3, Z2 and Z5, Z3 and Z5, and also Z4 and Z5.

In line with the meaning of the arrows between the radio cells Z1, Z2, Z3, Z4 and Z5 which is explained above, the management device EM1 has stored respective bidirectional handover relationships in respect of its own radio cells Z1, Z2 and Z3. This can be seen from the double-headed arrows between the radio cells Z1 and Z2, and also Z2 and Z3. The same also applies to the radio cells Z4 and Z5 of the management device EM2. Looking at adjacent radio cells which are monitored by different management device EM1 and EM2, a bidirectional handover relationship is stored in respect of the radio cells Z2 and Z4, i.e. in line with the handover relationships stored by the management device EM1 a handover from its master radio cell Z2 to the external radio cell Z4 is possible, and in line with the handover relationships stored by the management device EM2 a handover from its master radio cell Z4 to the external radio cells Z2 is possible. An equivalent situation also applies to the adjacent radio cells Z3 and Z5. In respect of the adjacent radio cells Z1 and Z4, however, only a unidirectional handover relationship is stored, because although the management device EM2 has stored that a handover is possible from its master radio cell Z4 to the external radio cell Z1, the management device EM1 has not stored that a handover is possible from its master radio cell Z1 to the external radio cell Z4. A similar situation applies to the adjacent radio cells Z2 and Z5: although the management device EM1 has stored that a handover is possible from its master radio cell Z2 to the external radio cell Z5, the management device EM2 has not stored that a handover is possible from its master radio cell Z5 to the external radio cell Z2.

The presence of unidirectional handover relationships is based on an inconsistency in the data of the management system. Detecting and removing these unidirectional handover relationships therefore increases the performance of the mobile radio communication system. Within the group of radio cells which is monitored by a single management device, it is easy to trace unidirectional handover relationships and convert them to bidirectional handover relationships. If radio cells are monitored by different management devices, on the other hand, as shown in FIG. 1, the related art requires a central device to be used which requests and compares the data records from the various management devices. This can be done using an NMC (Network Management Center) which is connected to the various management devices via a manager/agent interface.

Figure 2:
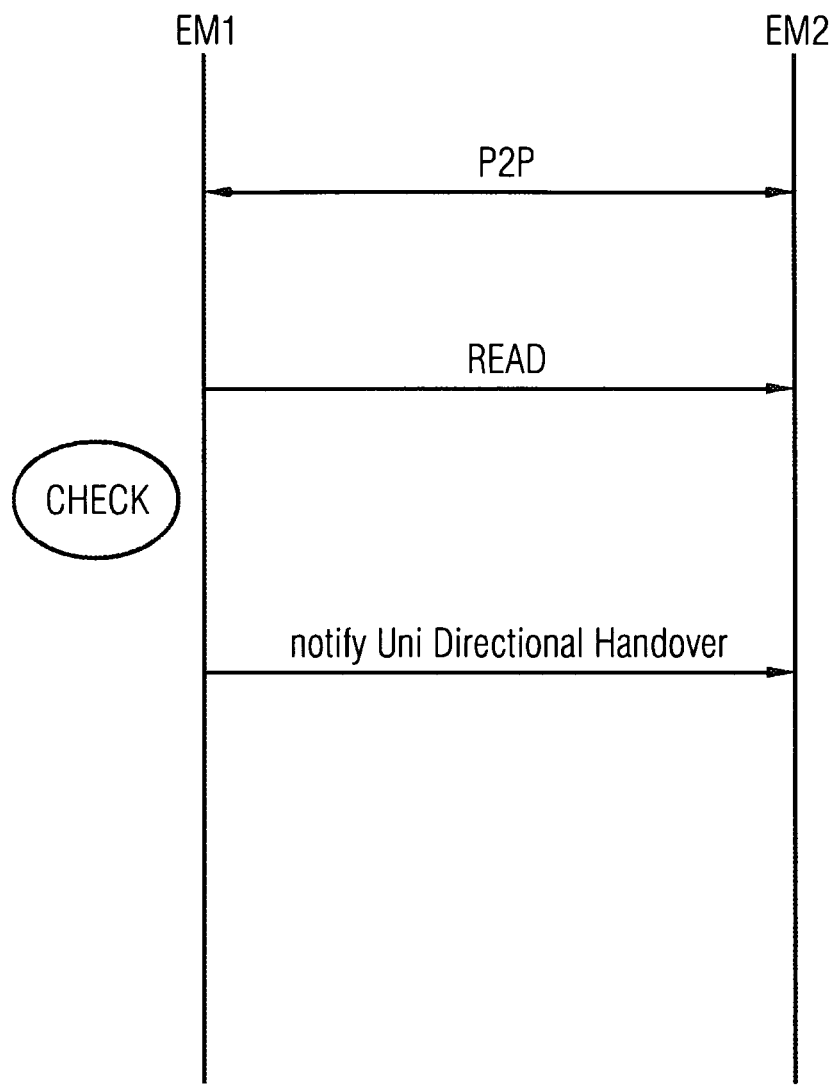
FIG. 2 is a signal transmission diagram of a sequence for communication between two management devices.

FIG. 2 shows the sequence of a method in which the management devices EM1 and EM2 communicate with one another via a peer-to-peer interface P2P. At the beginning, at READ, the management device EM1 asks the management device EM2 which radio cells the management device EM2 has stored as master objects, which radio cells the management device EM2 has stored as external objects, and which handover relationships the management device EM2 has stored between these radio cells. This is preferably asked using the upload operation of the Bulk CM IRP, described in the standard specifications 3GPP TS 32.611, 32.612, 32.613, 32.614, 32.615.

Next, at CHECK, a check is performed by the management device EM1 to determine whether there are unidirectional handover relationships. In respect of the handover relationships stored by the management device EM2, exclusively handover relationships between radio cells of the management device EM1 and the management device EM2 are considered for this. Any handover relationships stored by the management device EM2 between radio cells of the management device EM2 and a management device other than the management device EM1, and also between radio cells of the management device EM1 and a management device other than the management device EM2, are ignored in this case.

During a comparison of the handover relationships stored by the management device EM1 and the handover relationships stored by the management device EM2 between radio cells of the management device EM1 and the management device EM2, the management device EM1 establishes that there is a respective unidirectional handover relationship between the radio cells Z1 and Z4, and also between the radio cells Z2 and Z5. This unidirectional handover relationship is subsequently corrected by producing a bidirectional handover relationship.

In respect of the adjacent radio cells Z1 and Z4, the management device EM1 establishes that, on the basis of the handover relationships of the management device EM2, a handover from the radio cell Z4 to the radio cell Z1 is possible, while the converse handover from the radio cell Z1 to the radio cell Z4 cannot be performed on the basis of its own handover relationships. To correct this, the management device EM1 adds to its own handover relationships, so that a handover from the radio cell Z1 to the radio cell Z4 is now possible on the basis of the new handover relationships.

In respect of the adjacent radio cells Z2 and Z5, the management device EM1 establishes that, on the basis of the handover relationships of the management device EM1, a handover from the radio cell Z2 to the radio cell Z5 is possible, while the converse handover from the radio cell Z5 to the radio cell Z2 cannot be performed on the basis of the handover relationships of the management device EM2. To correct this, the management device EM1 sends a message notifyUniDirectionalHandover to the management device EM2.

This message notifyUniDirectionalHandover instructs the management device EM2 to revise its stored handover relationship such that a handover from the radio cell Z5 to the radio cell Z2 is possible on the basis of the new handover relationships.

Preferably, the message notifyUniDirectionalHandover contains the following contents:

objectClass: The object class of the radio cell Z2.
objectInstance: The object instance of the radio cell Z2. This variable is known only to the management device EM1 but not to the management device EM2. It nevertheless appears in the message notifyUniDirectionalHandover, so that it is easier for the management device EM1 to identify its radio cell Z2 upon later consideration of the message notifyUnidirectionalHandover.
targetCell: This is an identification variable which allows the management device EM2 to identify the radio cell Z2. This variable is set to zero if the management device EM2 does not know the radio cell Z2, i.e. has not yet stored it as an external object.
notificationId: This variable explicitly identifies the message notifyUniDirectional-Handover.
eventTime: This is the time at which the unidirectional handover relationship was discovered.
systemDN: This is an identification variable for the management device EM1.
notificationType: This variable indicates that the message is a message of the type notifyUniDirectionalHandover.
sourceCell: This is an identification variable which allows the management device EM2 to identify the radio cell Z5.
attributeListTargetCell: This is a sequence of attributes with their respective values which describe the radio cell Z2. This variable needs to be used if the management device EM2 does not know the radio cell Z2. In the present case, the management device EM2 has already stored the radio cell Z2 as an external object, however, which means that it is possible to dispense with the variable attributeListTargetCell or to insert zero into its value. Even if the management device EM2 already knows the radio cell Z2, however, it may make sense to use the variable attributeListTargetCell to transmit attribute values for the radio cell Z2, since this allows data alignment to take place between the external object of the management device EM2 and the master object of the management device EM1.

Following reception of the message notifyUniDirectionalHandover, the management device EM2 makes the changes to its handover relationships on the basis of the content of the message notifyUniDirectionalHandover. There is now a bidirectional handover relationship between the radio cells Z2 and Z5. As an alternative to sending the message notifyUniDirectionalHandover, it is possible for the management device EM1 to use the peer-to-peer interface P2P itself to make the requisite changes to the handover relationships of the management device EM2.

In addition or as an alternative to the method described being carried out by the management device EM1, this can also be done by the management device EM2. In this case, it is particularly possible for each management device EM1 and EM2 to be responsible merely for revising its own handover relationships. This makes it possible to dispense with the use of the message notifyUniDirectionalHandover.

One particular advantage is the use of the peer-to-peer interface P2P. This is because the use of this kind of interface allows the management devices to access the data records of the respective other management device directly. This allows local detection of unwanted unidirectional handover relationships.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a management system, comprising:
    storing first information relating to one or more first objects monitored by a first management device and one or more second objects monitored by a second management device, and relationships between the one or more first objects and the one or more second objects;
    requesting, by the first management device, second information stored by the second management device relating to the one or more first objects and the one or more second objects, and the relationships between the one or more first objects and the one or more second objects;
    using, at the first management device, the first and second information to ascertain at least one ascertained relationship between at least one of the one or more first objects and at least one of the one or more second objects, the at least one ascertained relationship being stored either only by the first management device or only by the second management device; and
    based on the at least one ascertained relationship, performing a handover either from one of the one or more first objects to one of the one or more second objects or from one of the one or more second objects to one of the one or more first objects.

2. The method as claimed in claim 1, further comprising the first management device changing the first information stored by the first management device in respect of at least one ascertained relationship which had been stored only by the second management device, so that the at least one ascertained relationship is also stored by the first management device.

3. The method as claimed in claim 2, further comprising the first management device changing the second information stored by the second management device in respect of at least one ascertained relationship which had been stored only by the first management device, so that the at least one ascertained relationship is also stored by the second management device.

4. The method as claimed in claim 3, wherein communication between the first management device and the second management device takes place via a peer-to-peer interface.

5. The method as claimed in claim 4, wherein the first and second information relating to the first and second objects monitored by the first and second management devices includes values for attributes of the first and second objects.

6. The method as claimed in claim 5, wherein the first and second objects are radio cells in a mobile radio communication system and the relationships between the first and second objects are handover relationships.

7. The method as claimed in claim 6, wherein the first and second management devices are homogeneous management devices.

8. The method as claimed in claim 1, further comprising the first management device sending a message to the second management device concerning relationship information about at least one relationship which is stored only by the first management device.

9. The method as claimed in claim 8, wherein the message includes first identification information relating to a first object monitored by the first management device and second identification information relating to a second object monitored by the second management device.

10. The method as claimed in claim 9, wherein the message relates to the first object which is monitored by the first management device and which is unknown to the second management device.

11. The method as claimed in claim 10, further comprising the second management device changing the second information stored by the second management device, so that the at least one relationship is also stored by the second management device.

12. A management device, comprising:
    means for storing first information relating to one or more first objects monitored by the management device, one or more second objects monitored by another management device, and relationships between the one or more first objects and the one or more second objects;
    means for requesting second information stored by the other management device relating to the one or more first objects and the one or more second objects and relating to the relationships between the one or more first objects and the one or more second objects;
    means for using the first and second information to ascertain at least one ascertained relationship between at least one of the one or more first objects and at least one of the one or more second objects, the at least one ascertained relationship being stored either only by the management device or only by the other management device; and
    means for performing, based on the at least one ascertained relationship, a handover either from one of the one or more first objects to one of the one or more second objects or from one of the one or more second objects to one of the one or more first objects.

13. A management system including at least first and second management devices, comprising:
    one or more first objects and one or more second objects monitored by the first and second management devices, respectively;
    the first management device including means for storing first information relating to the one or more first objects and the one or more second objects and relationships between the one or more first objects and the one or more second objects; and
    the second management device including:
    means for storing second information relating to the one or more first objects and the one or more second objects and the relationships between the one or more first objects and the one or more second objects;
    means for requesting the first information stored by the first management device relating to the one or more first objects and the one or more second objects and the relationships between the one or more first objects and the one or more second objects;

means for using the first and second information to ascertain at least one ascertained relationship between at least one of the one or more first objects and at least one of the one or more second objects, the at least one ascertained relationship being stored either only by the first management device or only by the second management device; and means for performing, based on the at least one ascertained relationship, a handover either from one of the one or more first objects to one of the one or more second objects or from one of the one or more second objects to one of the one or more first objects.

14. A method for operating a management system, the management system capable of managing objects representing network elements in a network element layer, comprising:

storing first information relating to one or more first objects monitored by a first management device and one or more second objects monitored by a second management device, and relationships between the one or more first objects and the one or more second objects;

requesting, by the first management device, second information stored by the second management device relating to the one or more first objects and the one or more second objects and the relationships between the one or more first objects and the one or more second objects, the first information and the second information relate to different sets of data records;

using, at the first management device, the first and second information to ascertain at least one ascertained relationship between at least one of the one or more first objects and at least one of the one or more second objects, the at least one ascertained relationship being stored either only by the first management device or only by the second management device; and performing a handover either from one of the one or more first objects to one of the one or more second objects or from one of the one or more second objects to one of the one or more first objects based on the at least one ascertained relationship.

* * * * *